Feb. 15, 1966  T. E. WEICHSELBAUM ET AL  3,234,595
APPARATUS FOR MOUNTING BIOLOGICAL SPECIMENS
Filed March 28, 1963  3 Sheets-Sheet 1
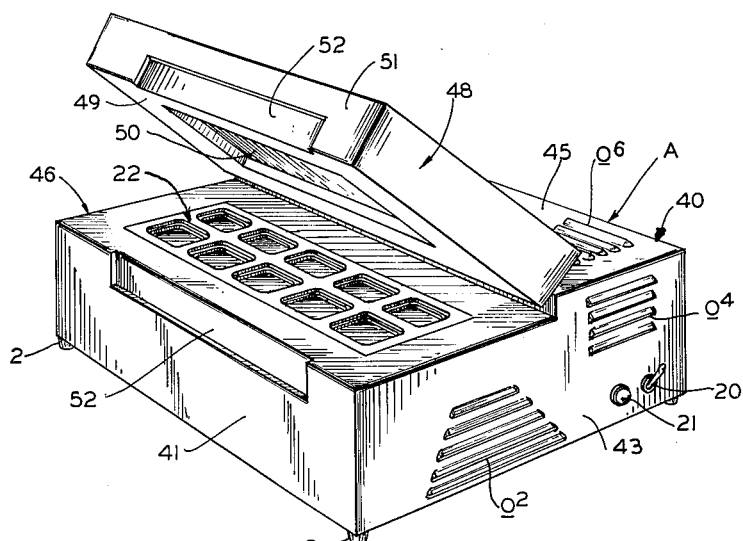
FIG. 1
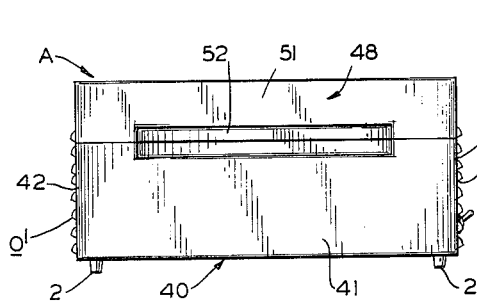
FIG. 2
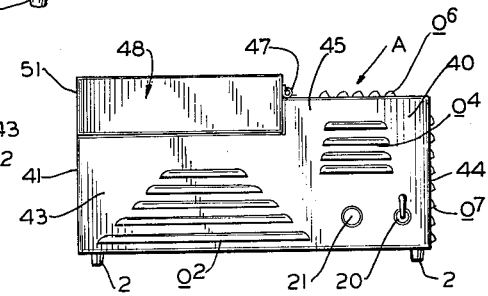
FIG. 3
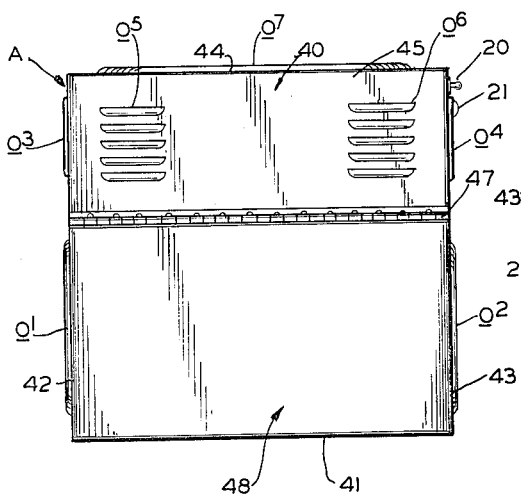
FIG. 4
FIG. 5
INVENTORS:
THEODORE E. WEICHSELBAUM
ANTON J. HORN
BY
ATTORNEY Feb. 15, 1966     T. E. WEICHSELBAUM ET AL     3,234,595
APPARATUS FOR MOUNTING BIOLOGICAL SPECIMENS
Filed March 28, 1963     3 Sheets-Sheet 2
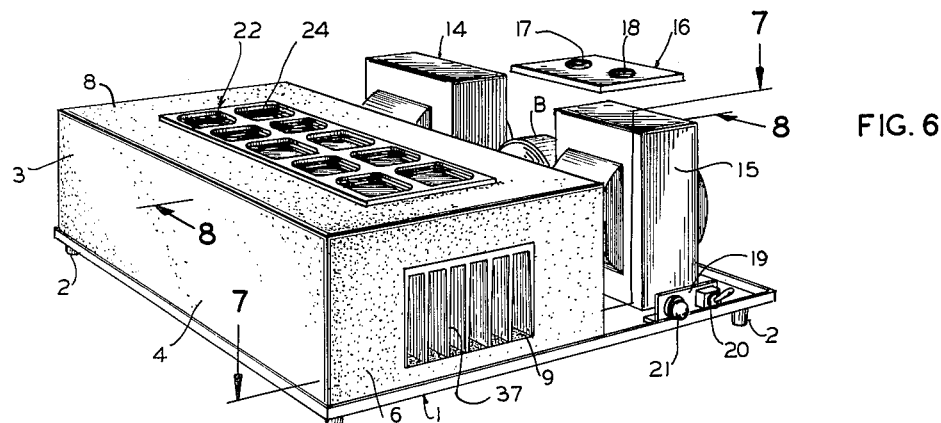
FIG. 6
FIG. 7
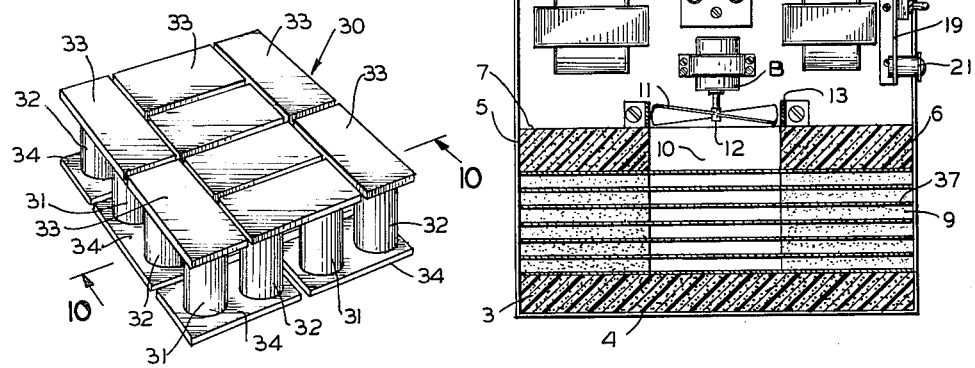
FIG. 9
FIG. 10
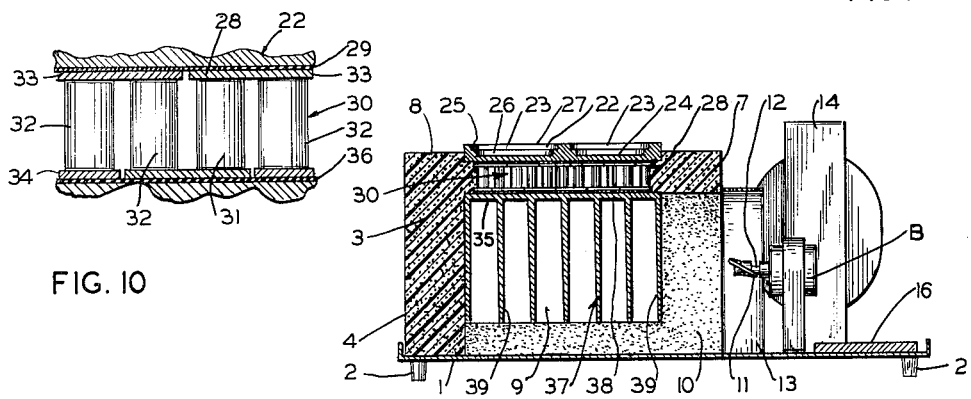
FIG. 8
INVENTORS:
THEODORE. E. WEICHSELBAUM
ANTON J. HORN
BY
*Alfred W Petchaft*

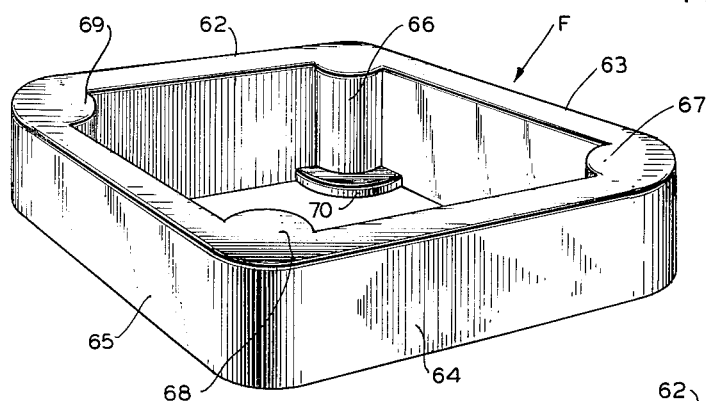
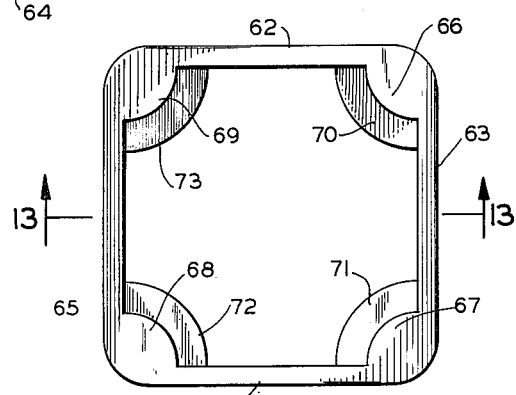
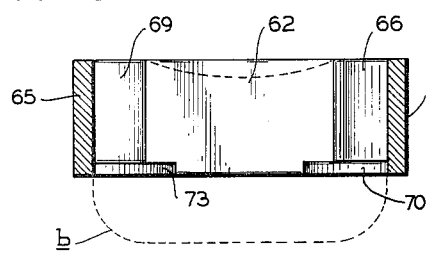
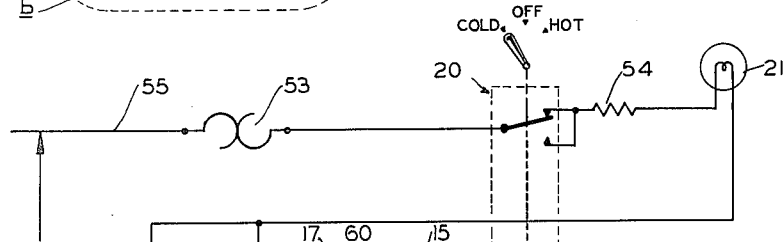

United States Patent Office 3,234,595
Patented Feb. 15, 1966

3,234,595
APPARATUS FOR MOUNTING BIOLOGICAL SPECIMENS
Theodore E. Weichselbaum, Normandy, and Anton J. Horn, Creve Coeur, Mo., assignors to Biological Research, Inc., Bridgeton, Mo., a corporation of Delaware
Filed Mar. 28, 1963, Ser. No. 268,655
12 Claims. (Cl. 18—5)

This invention relates in general to certain new and useful improvements in apparatus for mounting biological specimens, and, more particularly, to apparatus for preparing biological specimens which are to be sectioned in a microtome.

In preparing tissue samples and similar biological specimens for microscopic examination, it is customary practice to embed the tissue samples or biological specimens in a block of wax or similar thermoplastic material. When the block of wax has solidified firmly, it is placed within the jaws of a microtome and cut into very thin sections which can be mounted upon a microscope slide or similar glass plate. Very often, after cutting a few sections, it is desirable to store the sample for future use, and cut successive sections from the sample or specimen at a later time. Inasmuch as the block of wax or other material is somewhat fragile and, furthermore, since it is desirable that subsequent sections be cut along a plane which is precisely parallel to the plane along which the initial sections have been cut, it is necessary to mount the block upon some type of mechanical holder so that it can readily be handled, stored for subsequent use, and readily positioned from time to time within the jaws of a microtome. Up to the present time, the mechanical expedients employed for mounting such blocks of wax are time-consuming, bulky, and somewhat inefficient.

It is, therefore, the primary object of the present invention to provide means for mounting biological specimens which is simple, efficient, and economical.

It is another object of the present invention to provide means for mounting biological specimens by which initially molten wax or other embedding material can be poured into and solidified within a mechanical holder that is simple, compact, and securely attached.

It is a further object of the present invention to provide means of the type stated by which a plurality of biological specimens can be separately embedded within individual blocks of embedment material, or removed therefrom, in a convenient, rapid, and highly efficient manner.

It is an additional object of the present invention to provide a device by which a biological specimen or tissue sample can be embedded within a block of thermoplastic embedding material, and the resulting mass quickly chilled to a proper degree of firmness for sectioning in a microtome.

It is also an object of the present invention to provide a device for chilling a plurality of blocks of thermoplastic material, which device is simple and economical in construction, and highly efficient in operation.

It is a further object of the present invention to provide a device of the type stated which is compact and operates with virtually no noise and vibration, thereby being unusually well adapted for use in hospitals, scientific laboratories, and similar establishments.

With the above and other objects in view, my invention resides in the novel features of form, construction, arrangement, and combination of parts presently described and pointed out in the claims.

In the accompanying drawings (three sheets):

FIG. 1 is a perspective view of a sample-chilling device constructed in accordance with and embodying the present invention, showing the device with the lid or cover in partially open position;

FIG. 2 is a front elevational view of the sample-chilling device with the cover or lid in closed position;

FIG. 3 is a side elevational view of the sample-chilling device;

FIG. 4 is a top plan view of the sample-chilling device;

FIG. 5 is a rear elevational view of the sample-chilling device;

FIG. 6 is a perspective view of the sample-chilling device with the cover and case removed to show the interior construction thereof;

FIGS. 7 and 8 are horizontal and vertical sectional views taken along lines 7—7, and 8—8, respectively, of FIG. 6;

FIG. 9 is a perspective view of the refrigerating cell forming a part of the present invention;

FIG. 10 is a fragmentary sectional view taken along line 10—10 of FIG. 9;

FIG. 11 is a perspective view of a sample holding frame constructed in accordance with and forming a part of the present invention;

FIG. 12 is a top plan view of the sample holding frame;

FIG. 13 is a vertical sectional view taken along line 13—13 of FIG. 12; and

FIG. 14 is a wiring-diagram showing the electrical connections between the various electrical components forming a part of the present invention.

Referring now in more detail and by reference characters to the drawings, A designates a sample chilling device comprising a rectilinear base 1 provided at its four corners with short depending legs 2, preferably formed of relatively firm rubber or other similar impact-absorbing material.

Rigidly mounted upon the forward portion of the base 1 and extending upwardly therefrom is a relatively large rectilinear block 3 formed of a suitable heat-insulating material such as polystyrene foam, for example. The block 3 is provided with a front face 4, end faces 5, 6, a rear face 7, and a horizontal top face 8. Extending transversely through the block 3 from the end face 5 to the end face 6, approximately midway between the front face 4 and the rear face 7, is a rectilinear tunnel 9 which is centrally provided with a rearwardly extending similarly shaped tunnel or passage 10, the latter being midway between the end faces 5, 6, and opening upon the rear face 7 for presentation to the discharge side of a fan blade 11 which is rigidly mounted on the outer end of a shaft 12 forming part of an electric motor B which is, in turn, rigidly mounted upon the rear portion of the base 1. The fan blade 11 is operatively mounted within a narrow encircling shroud 13 which is also rigidly secured to the base 1 and is disposed around the fan 11 in such a manner as to channel the air flow directly into the tunnel 10. The fan blade 11 may be of any conventional shape and design, and should be capable of relatively silent operation so as to produce a relatively high volume flow of air.

Also rigidly mounted upon the rearward portion of the base 1 is a transformer 14, a choke coil 15, and a heavy rectilinear metal plate 16, adapted to function as a heat-sink for a pair of diodes 17, 18, mounted directly thereon. Also rigidly mounted on the rear portion of the base 1 in coplanar alignment with the side face 6 of the block 3 is a small upstanding bracket plate 19 which supports a conventional manual toggle-switch 20, and pilot light 21.

Firmly embedded within the top surface 8 of the block 3 is a rectangular mold-plate 22 formed preferably of aluminum or other similar material having a high-coefficient of heat conductivity. Molded or otherwise suitably formed in the upper surface of the mold-plate 22 is a plurality of depressions or cavities 23 having flat bottom faces 24 which merge smoothly along rounded cove-forming surfaces 25 into continuous peripheral side walls 26. Adjacent their upper ends, the cavities 24 are peripherally enlarged to provide narrow rim-portions 27, all as best seen in FIGS. 6 and 8, and for purposes presently more fully appearing.

The mold-plate 22 has a flat underface 28 which is centrally provided with a thin rectangular sheet 29 of high-dielectric heat-conductive material such as mica, and securely mounted against the underface of the sheet 29 is a thermoelectric refrigerative element or cell 30 consisting of a plurality of cylindrical pellets 31, 32, formed of bismuth telluride. The pellets 31 are of the so-called P-type and the pellets 32 are of the so-called N-type, and are respectively connected by means of upper rectangular copper plates 33, and lower rectangular copper plates 34. As will be seen by reference to FIGS. 9 and 10, the copper plates 33, and 34, are arranged in alternate direction so that each such copper plate will extend between, and electrically connect two different pellets 31, 32. By this means, the P-type pellets 31 are alternately connected in series with the N-type pellets 32. In this connection, it should be noted that it is a characteristic of bismuth telluride pellets that when a direct current is passed through such pellets, one end face of the pellet will become cold and the other end face of the pellet will become hot. Moreover, the difference between P-type pellets and N-type pellets is that different end faces become hot and cold respectively, depending upon the direction of current flow through the pellets. Thus, if the end face at which the current enters the pellet be termed the positive face, and the end face at which the current leaves the pellet be termed the negative face, current will, of course, flow through the pellet from the positive face to the negative face. In the case of P-type pellets, the positive face will become cold and in the case of N-type pellets, the negative face will become cold. Consequently, by arranging the pellets 31 and 32 in such a manner that all of the positive ends of the pellets 31 and all of the negative end faces of the pellets 32 are presented upwardly against the upper copper plates 33, the current will flow, for example, through a plate 33 downwardly through a pellet 31, thence across through the plate 34, and upwardly through a pellet 32 to another plate 33. As a result, all of the plates 33 will become cold and all of the plates 34 will become hot. It will also be noted, by reference to FIG. 8, that the upper plates 33 are the ones which are in heat-conductive engagement against the sheet 29. Moreover, the thermoelectric cell 30 is securely embedded within the block 3 and extends downwardly therethrough so that the undersurfaces of the plates 34 will be approximately flush with the top surface 35 of the transverse tunnel 9.

On its underface, the thermoelectric cell 30 is rigidly provided with a second thin high-dielectric heat conductive sheet 36 which electrically insulates it from a large heat dissipating radiator 37 which is preferably an aluminum extrusion and integrally includes an elongated rectilinear base-plate 38 having approximately the same peripheral dimensions as the upper face 35 of the tunnel 9 and being provided in its underface with a plurality of thin, uniformly spaced parallel fins 39 which extend downwardly across the tunnel 9 with their lower longitudinal margins spaced upwardly from the upper face of the base 1. Thus, the air stream generated by the fan blade 11 will flow forwardly into the tunnel 10 and be deflected downwardly by the rearmost fin 39. Thence, the air stream will flow forwardly along the lower part of the tunnel 9 and up between the other fins 39, finally flowing laterally in both directions along all of the fins 39, thereby achieving maximum heat-exchange.

Disposed enclosingly around the block 3 and the electrical components on the base 1 is an external case or housing 40, preferably molded of high-impact polystyrene or other suitable material. The housing 40 integrally includes a front wall 41, transverse side walls 42, 43, and a rear wall 44. The top area of the housing 40 is higher at the rear thereby providing a raised portion 45 which encloses the upper portions of the transformer 14 and choke coil 15. The front portion 46 of the housing 40 is provided with a rectangular opening which fits snugly around, and frames, the mold-plate 22. As may be seen by reference to FIG. 8, the mold-plate 22 projects upwardly above the top face 8 of the block 3 by a distance equal to the thickness of the front portion 46 so that the latter is flush along its upper surface with the upper surface of the mold-plate 22. The various walls of the housing 40 are provided with louvered openings $o^1$, $o^2$, $o^3$, $o^4$, $o^5$, $o^6$, $o^7$ to facilitate free movement of the air stream generated by the fan blade 11.

Swingably mounted upon the forwardly presented upper longitudinal margin of the raised portion 45 by means of a piano-type hinge 47, is a hollow cover or lid 48 which fits down over the front portion 46 in marginal registration therewith. Internally, the lid 48 is provided with a heat-insulative block or filler 49, the underface of which is hollowed out over the area occupied by the cavities 23 in the provision of a clearance recess 50. The forwardly presented face 51 of the lid 48 is flush with the front face 41 of the housing 40 and these faces 41, 51, are indented centrally along their meeting edges to provide a finger-grip recess 52 to facilitate manual manipulation of the lid 48.

The electrical components are connected as shown in FIG. 14. The circuit includes a conventional circuit-breaker 53 and resistor 54 which are in series with the switch 20, and the pilot light 21, said circuit breaker 53, resistor 54, switch 20, and pilot light 21 being interposed in the main power line 55 by which one terminal of the primary 56 of the transformer 14 is connected to one side of a 117 volt A.C. electric power source. The other terminal of the primary 56 is connected by the other main line 57 to the other side of the electric power source. The fan motor B is connected across the main lines 55, 57, in parallel with the primary 56. The secondary 58 of the transformer 14 has a center tap 59 which is connected directly to one terminal of the thermoelectric cell 30. The terminals of the secondary 58 are connected through diodes 17, 18, to a common lead 60 which is, in turn, connected to one terminal of the choke coil 15. The other terminal of the choke coil 15 is connected by a lead 61 to the other terminal of the thermoelectric cell 30. When the switch 20 is in one position, polarity is such that the upper plates 33 are cold junctions. Conversely, when the switch 20 is in the other position, the polarity is reversed and the plates 33 are hot junctions. The magnitude of the amperage and voltage applied to the thermoelectric cell 30 will, of course, depend upon the size of the device A. In the practical embodiment of the invention, shown and described herein, the mold-plate 22 has ten cavities 23, each of approximately 15 cc. capacity and intended to maintain an operating temperature of about 15° F. when the switch 20 is in the so-called "cold" position. For this device, the thermoelectric cell 30 will draw about .65 to .75 ampere at a range of 20 volts to 30 volts D.C. Conversely, when the switch 20 is in a so-called "hot" position, the mold-plate will quickly become hot enough to melt the embedding material.

Provided for cooperation with the mold-plate 22 is a plurality of identical mounting frames F, each of which includes four equal side walls 62, 63, 64, 65, integrally connected by rounded corner posts 66, 67, 68, 69, which project inwardly forming an open-ended structure peripherally sized to fit freely and interchangeably within the rims 27 of any one of the cavities 23.

In use, the device A is connected to a suitable source of electric power and allowed to run for a few minutes until the mold-plate 22 is chilled down to the desired temperature range. Thereupon, biological specimens are placed in the cavities 23 and roughly centered upon the bottom faces 24. In the device A as illustrated ten such specimens can be mounted at a time. Mounting frames F are then set down into the rims 27 and molten paraffin wax or some other similar thermoplastic material is poured through the open top of each mounting frame F into each of the cavities in which a specimen has been placed. The molten wax flows around the specimen, completely covering and enclosing it. Due to the temperature of the mold-plate 22 and the mounting frames F, the molten material immediately solidifies as it fills the cavity 23 and mounting frame F, so that the specimen becomes securely embedded in a solid block *b* (indicated in dotted lines in FIG. 13) which is firmly attached within the mounting frame F. Because of the relative differences in temperature between the mounting frame F and the mold-plate 22, and also by reason of the quick-chilling of the specimen and molten material, several desirable results are achieved. The molten material within the cavity 23 shrinks slightly away from the side walls 26 so that the embedded specimen and wax block *b* can be easily lifted out of the cavity 23. In addition, the attachment between the mounting frame F and the wax block *b* is very tight and mechanically strong. Moreover, the embedment occurs so rapidly that the heat of the molten material is momentary and cannot have a deleterious effect on the biological specimen.

When the mounting frame F of each cavity 23 is filled, the lid 48 is closed and the embedded specimens allowed to chill thoroughly for approximately ten to fifteen minutes. Thereupon, the frames F, together with blocks *b* and embedded specimens, can be removed from the device A and further handled in any desired manner. If, at a later time, it is desired to "dis-embed" a specimen, so to speak, the frame F and block *b* can be placed in a cavity 23. Thereupon, the switch 20 can be shifted to "hot" position and the embedding material softened or melted to permit removal of the unused portion of the specimen.

It should be understood that changes and modifications in the form, construction, arrangement, and combination of the several parts of the means for mounting biological specimens may be made and substituted for those herein shown and described without departing from the nature and principle of our invention.

Having thus described our invention, what we claim and desire to secure by Letters Patent is:

1. A device for solidifying molten embedment material around a biological specimen; said device comprising a relatively thick, horizontally disposed heat-conductive plate having at least one upwardly opening mold-cavity formed therein, said plate being set into a block of thermally insulative material so that the lower portion of the plate is embedded within the block and the top surface and opening to the mold-cavity are exposed, thermoelectric means embedded wholly within the block and rigidly secured directly in heat conductive relationship upon the embedded portion of said plate for reducing the temperature of the plate substantially below ambient temperature, and a heat sink also embedded within the block and being rigidly secured in heat conductive relation to the thermoelectric means, said heat sink having a plurality of air-passages therethrough which open upon lateral faces of the block.

2. A device for solidifying molten embedment material around a biological specimen; said device comprising a relatively thick, horizontally disposed heat-conductive plate having at least one upwardly opening mold-cavity formed therein, said plate being set into a block of thermally insulative material so that the lower portion of the plate is embedded within the block and the top surface and opening to the mold-cavity are exposed, thermoelectric cold junction means embedded wholly within the block and rigidly secured directly in heat conductive relationship upon the embedded portion of said plate for reducing the temperature of the plate substantially below ambient temperature, a heat sink also embedded within the block and being rigidly secured in heat conductive relation to the thermoelectric means, said heat sink having a plurality of air-passages therethrough which open upon lateral faces of the block, and heat-insulative cover means removably mounted over the top of the plate to enclose the top surface thereof.

3. A device for solidifying molten embedment material around a biological specimen; said device comprising a relatively thick, horizontally disposed heat-conductive plate having at least one open topped mold-cavity formed therein, said plate being set into a block of thermally insulative material so that the lower portion of the plate is embedded within the block and the top surface and opening to the mold-cavity are exposed, a layer of high-dielectric heat-conductive material secured upon the embedded portion of said plate, thermoelectric means embedded wholly within the block and disposed in heat-conductive abutment against said layer of high-dielectric heat-conductive material for reducing the temperature of the plate substantially below ambient temperature, and a heat sink also embedded within the block and being rigidly secured in heat conductive relation to the thermoelectric means, said heat sink having a plurality of air-passages therethrough which open upon lateral faces of the block.

4. A device for optionally hardening and softening molten embedment material around a biological specimen; said device comprising a relatively thick, horizontally disposed heat-conductive plate and having a plurality of upwardly opening mold-cavities formed therein, said plate being set into a block of thermally insulative material so that the lower portion of the plate is embedded within the block and the top surface and opening to the mold-cavity are exposed, a layer of high-dielectric heat-conductive material secured upon the embedded portion of said plate, thermoelectric means embedded wholly within the block and disposed in heat-conductive abutment against said layer of high-dielectric heat-conductive material for optionally lowering and raising the temperature of the plate substantially below and above ambient temperature, a heat sink also embedded within the block and being rigidly secured in heat conductive relation to the thermoelectric means, said heat sink having a plurality of air-passages therethrough which open upon lateral faces of the block, and heat-insulative cover means removably mounted over the top of the plate to enclose the top surface thereof.

5. A device for solidifying molten embedment material around a biological specimen according to claim 1 in which the block has a tunnel formed therein for the passage of air, and means provided for forcing a stream of air through the tunnel in heat-exchange relationship with the heat-sink.

6. A device for solidifying molten embedment material around a biological specimen according to claim 3 wherein the air-passages of the heat sink constitute a tunnel formed therein for the passage of air, said heat-sink being cut away intermediate its ends to form a medial opening, and means for causing a stream of air to flow through said medial opening and then flow in opposite directions through the tunnel.

7. A device for solidifying molten embedment material around a biological specimen according to claim 4 wherein the block is mounted upon a base plate and wherein means for supplying direct current to said thermoelectric means is also mounted directly upon said base plate.

8. A device for softening molten embedment material around a biological specimen; said device comprising a heat insulative block, a heat-conductive plate mounted in the block, so that the lower portion of the plate is embedded within the block with the top surface of the plate accessible from the top of the block, said plate having at least one mold-cavity formed in its top surface, said block having a tunnel formed therein for the passage of air, thermoelectric means embedded wholly within the block and rigidly secured directly in heat conductive relationship upon the embedded portion of said plate for raising the temperature of the plate substantially above ambient temperature, and a heat sink also embedded within the block and being rigidly secured in heat conductive relation to the thermoelectric means, said heat sink having a plurality of air-passages therethrough which open upon lateral faces of the block.

9. A device for softening molten embedment material around a biological specimen; said device comprising a heat insulative block, a heat-conductive plate mounted in the block, so that the lower portion of the plate is embedded within the block with the top surface of the plate accessible from the top of the block, said plate having at least one mold-cavity formed in its top surface, said block having a tunnel formed therein for the passage of air, means for causing a stream of air to flow through said tunnel, a layer of high-dielectric heat-conductive material secured upon the embedded portion of said plate, thermoelectric means embedded wholy within the block and disposed in heat conductive abutment against said layer of high-dielectric heat-conductive material for raising the temperature of the plate substantially above ambient temperature.

10. A device for softening molten embedment material around a biological specimen; said device comprising a relatively thick, horizontally disposed heat-conductive plate having at least one upwardly opening mold-cavity formed therein, said plate being set into a block of thermally insulative material so that the lower portion of the plate is embedded within the block and the top surface and opening to the mold-cavity are exposed, thermoelectric means embedded wholly within the block and rigidly secured directly in heat conductive relationship upon the embedded portion of said plate for raising the temperature of the plate substantially above ambient temperature, a heat sink also embedded within the block and being rigidly secured in heat conductive relation to the thermoelectric means, said heat sink having a plurality of air-passages therethrough which open upon lateral faces of the block, and means for supplying direct current to said thermoelectric means.

11. A device for solidifying molten embedded material around a biological specimen according to claim 3 and further characterized by a heat insulative cover element swingably mounted in overlying relation with respect to said block, and the top surface of said plate, in such a manner as to optionally overlie said plate.

12. A device for softening molten embedded material around a biological specimen according to claim 9 and further characterized by a heat insulative cover element swingably mounted in overlying relation with respect to said block, and the top surface of said plate, in such a manner as to optionally overlie said plate.

References Cited by the Examiner
UNITED STATES PATENTS

| | | | |
|---|---|---|---|
| 2,922,284 | 1/1960 | Danielson et al. | 62—3 |
| 2,932,953 | 4/1960 | Beeket et al. | 62—3 |
| 3,073,127 | 1/1963 | Schmerzler | 62—3 |
| 3,077,079 | 2/1963 | Pietsch | 62—3 |

J. SPENCER OVERHOLSER, *Primary Examiner.*

MICHAEL V. BRINDISI, *Examiner.*